United States Patent

[11] 3,607,791

[72] Inventor Francis J. Shell
 Bartlesville, Okla.
[21] Appl. No. 883,988
[22] Filed Dec. 10, 1969
[45] Patented Sept. 21, 1971
[73] Assignee Phillips Petroleum Company

[54] METHOD FOR REMOVING HYDROCARBONS
 8 Claims, No Drawings
[52] U.S. Cl. ............................................. 431/2,
  210/40, 210/DIG. 21, 431/8
[51] Int. Cl. ...................................................... E02b 15/04
[50] Field of Search ............................................ 210/36, 39,
  40, 242, DIG. 21; 431/2, 8

[56] References Cited
UNITED STATES PATENTS
3,414,511 12/1968 Hitzman ...................... 210/40
3,518,183 6/1970 Evans ........................... 210/DIG. 21

*Primary Examiner*—Samih N. Zaharna
*Attorney*—Young & Quigg

ABSTRACT: A method for removing hydrocarbons from the surface of a body of water by placing a polypropylene sheet over and in contact with the hydrocarbons and combusting those hydrocarbons passing onto the upper surface of the sheet.

METHOD FOR REMOVING HYDROCARBONS

This invention resides in a method for removing hydrocarbons from the surface of a body of water. In another aspect, this invention resides in a method for removing hydrocarbons from the surface of a body of water and providing for the disposition of said hydrocarbons by combustion.

The problem of removing hydrocarbons from the surface of a body of water has become more acute as the number of offshore oil and gas wells has increased. Regardless of the precautionary practices that are employed, accidental spillage or the discharge of hydrocarbons into the water from offshore well sites have occurred. Other waters, such as inland lakes, fresh water streams, stock ponds, and the like are also sometimes polluted by hydrocarbons from subterranean formations.

Various methods have been heretofore employed for removing hydrocarbons, particularly crude oil, from the surface of the water. One method is to burn the hydrocarbons in contact with the water. This method is proven to be relatively ineffective owing to the rapid dispersion of the hydrocarbons across the surface of the water by wind and wave action and the natural tendency of the hydrocarbons to spread outwardly. It has also been experienced that these water-supported hydrocarbons are exceedingly difficult to ignite, and in addition, a uniform and complete burn is practically impossible to accomplish.

Absorption material particles have been used whereby the absorbent is brought into contact with the hydrocarbon, said hydrocarbon is absorbed and thereafter the composite material particles are removed from the surface of the water. This method improved the elimination of hydrocarbons from the surface of the water, but is a method which requires a great amount of labor, equipment, and time. The composite material also is practically impossible to substantially completely remove from the water and often results in temporary fouling of beaches and shorelines. Dispersing agents have likewise been utilized, but, as in the use of absorbing particles, wind and wave action often spread the hydrocarbons over wide areas and cause substantial removal or dispersion of the hydrocarbons to be extremely difficult.

It is therefore an object of this invention to provide a method for removing hydrocarbons from the surface of a body of water while maintaining said hydrocarbons against dispersion by wind, wave, and gravity forces. Another object of this invention is to provide for substantially complete removal and elimination of the hydrocarbons from the surface of a body of water by combusting said hydrocarbons. Other aspects, objects, and advantages of the present invention will become apparent from a study of the disclosure and the appended claims.

In the method of removing hydrocarbons from the surface of a body of water, a sheet of polypropylene fabric is placed in contact with and over at least a portion and preferably all of the hydrocarbons, particularly crude oil, desired to be removed. The polypropylene sheet is then maintained in contact with the hydrocarbons while portions of the hydrocarbons are passing from a location to meet the polypropylene sheet through and to a position on an upper surface of said polypropylene sheet spaced from the surface of the water by the intervening polypropylene sheet. The hydrocarbons positioned on the upper surface of the polypropylene sheet are thereafter ignited and combusted. It should be understood that ignition of the hydrocarbons does not have to be delayed until substantially all of the hydrocarbons have passed through the sheet. It has been found that initial combustion of hydrocarbons on the upper surface of the polypropylene sheet does not destroy the sheet and during said combustion, hydrocarbons located beneath and in contact with the sheet pass upwardly through the sheet and are combusted on said upper surface. The polypropylene sheet thereby functions as a wick and causes the hydrocarbons to be removed and separated from the surface of the water and supports said hydrocarbons in a spaced relationship from the water surface during combustion. Ignition of the hydrocarbons can be by several methods whereby a flame is brought into contact with said hydrocarbons.

In order to maintain the hydrocarbons against movement by wind, wave, and gravity forces, it is preferred that the polypropylene sheet have dimensions sufficient to cover substantially all of the hydrocarbons located on the water surface. The invention can be practiced, however, with sheets having an area smaller than the area occupied by the hydrocarbons. In such cases, however, it is important that adjacent sheets be positioned with edges overlapping one another in order to protect portions of the hydrocarbon layer from being disturbed by the above-mentioned forces.

Since some hydrocarbon pollutions cover large areas, it has been found advantageous to provide attachment means adjacent the edges of each sheet in order that a plurality of sheets can be affixed one to the other to form a single composite sheet having dimensions sufficient to cover a hydrocarbon layer having a particular area. Examples of such attachment means are: snap fasteners, hook and eye arrangements, sewing adjacent sheets together and heat-sealing portions of one sheet to the other.

Where a single sheet having a large area is utilized, it has been found to be particularly advantageous to utilize sheets having a plurality of elongated inforcing elements connected thereto or formed thereof. These reinforcing elements should also have a density of less than the density of water in order that said elements float and do not tend to pull the sheet beneath the surface of the water. It has been found effective, however, to have the outer edges of the sheet weighted slightly to cause the peripheral few feet of the sheet to sink below the surface of the water. This sheet edge weighting facilitates maintaining the hydrocarbons beneath the sheet and prevents wind from blowing under the sheet and raising the sheet from contact with the hydrocarbons.

Reinforcing elements such as threads, ropes, tapes, strips of cloth, and the like can be attached to the sheet for strengthening the sheet and protecting said sheet against damage during handling or by the wind and wave forces during utilization.

The sheet of desired area can be placed over and in contact with the hydrocarbon by elevating one end of the sheet a distance above the surface of the hydrocarbons, maintaining said end between two or more vehicles and pulling said sheet, raised end first, toward and to a desired position relative to the hydrocarbons and thereafter releasing said sheet end from the vehicles. Other methods for placing the sheet in contact with the hydrocarbons are, for example, by unrolling the sheet from a boat onto the pollution area, dropping the sheet from a helicopter and the like.

The polypropylene sheet utilized in the method of this invention is preferably a nonwoven, fused fabric formed of polypropylene or a mixture formed of a polypropylene and other synthetic fibers. It is important, however, that said resultant fabric have a density less than the density of the water in which said sheet is to be utilized. It has also been found that with a needle-punched sheet, higher viscosity hydrocarbons can be more quickly passed to the surface of the sheet and combusted. Other materials that can be used for forming the sheet of this invention are polyethylene and other synthetic materials that pass hydrocarbons therethrough and restrict the passage of water at atmospheric pressure.

An example polypropylene sheet for the method of this invention is as follows:

| Material | Polypropylene |
|---|---|
| Dimensions (individual sheets) | |
| Length | 100 yards |
| Width | 2 yards |
| Thickness | 0.05 inch |
| Number of individual sheets | 200 |
| Attachment means | Snap fasteners |
| Reinforcing elements | Randomly positioned spaced apart, thermoplastic tape having a width of 1 inch |

The individual sheets are snapped together to form a single sheet having a length of 400 yards. The sheets can be formed for example by the method set forth in U.S. Pat. No. 3,452,128.

Other modifications and alterations of this invention will become apparent to those skilled in the art from the foregoing discussion and it should be understood that this invention is not to be unduly limited thereto.

I claim:

1. A method for removing hydrocarbons from the surface of a body of water, comprising:

placing a sheet of synthetic material in contact with and over at least a portion of the hydrocarbons, said synthetic material having the characteristic of passing hydrocarbons therethrough while restricting the passage of water at atmospheric pressure;

maintaining the sheet in contact with the hydrocarbon while portions of the hydrocarbons are passing from a location beneath the sheet through and to a position on an upper surface of said sheet; and igniting and combusting the hydrocarbons positioned on the upper surface of the sheet.

2. A method, as set forth in claim 1, including covering substantially all of the hydrocarbons located on the water surface with a single sheet.

3. A method, as set forth in claim 1, wherein the sheet is needle-punched, nonwoven polypropylene fabric.

4. A method, as set forth in claim 1, including placing a material sheet over and in contact with the hydrocarbons by elevating one end of the sheet a distance above the surface of the hydrocarbons, maintaining said end between at least two vehicles, and pulling said sheet raised end first toward and to a desired position relative to the hydrocarbons; and thereafter releasing said end from the vehicles.

5. A method, as set forth in claim 1, including providing a material sheet having a plurality of elongated reinforced elements connected thereto, said reinforcing elements having a density less that that of water.

6. A method, as set forth in claim 1, including attaching a plurality of material sheets one to the other to form a single composite material sheet.

7. A method, as set forth in claim 1, wherein the synthetic material is polyethylene.

8. A method, as set forth in claim 1, wherein the synthetic material is polypropylene.